(12) United States Patent
Chen et al.

(10) Patent No.: US 11,481,491 B2
(45) Date of Patent: *Oct. 25, 2022

(54) MANAGING VIRUS SCANNING OF CONTAINER IMAGES

(71) Applicant: Red Hat, Inc., Raleigh, NC (US)

(72) Inventors: Huamin Chen, Westboro, MA (US); Dennis Keefe, Smithfield, RI (US)

(73) Assignee: RED HAT, INC., Raleigh, NC (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/084,834

(22) Filed: Oct. 30, 2020

(65) Prior Publication Data

US 2021/0073382 A1    Mar. 11, 2021

Related U.S. Application Data

(63) Continuation of application No. 16/015,956, filed on Jun. 22, 2018, now Pat. No. 10,872,150.

(51) Int. Cl.
  *G06F 21/56* (2013.01)

(52) U.S. Cl.
  CPC .......... *G06F 21/561* (2013.01); *G06F 21/564* (2013.01); *G06F 2221/034* (2013.01)

(58) Field of Classification Search
  CPC . G06F 21/561; G06F 21/564; G06F 2221/034
  USPC ........................................................ 726/24
  See application file for complete search history.

(56) References Cited

U.S. PATENT DOCUMENTS

| | | |
|---|---|---|
| 7,188,367 B1 | 3/2007 | Edwards |
| 8,959,595 B2 | 2/2015 | Wang et al. |
| 9,141,794 B1 * | 9/2015 | Soubramanien ........ G06F 1/329 |
| 9,384,207 B2 | 7/2016 | Provenzano et al. |
| 9,514,312 B1 | 12/2016 | Antoun et al. |
| 2005/0132206 A1 * | 6/2005 | Palliyil ................. G06F 21/645 713/188 |
| 2017/0068676 A1 | 3/2017 | Jayachandran |

(Continued)

FOREIGN PATENT DOCUMENTS

CN        107423422 A      12/2017

OTHER PUBLICATIONS

Xia, N., et al., "UKSM: Swift Memory Deduplication via Hierachical and Adaptive Memory Region Distilling," State Key Laboratory for Novel Software Technology, Nanjing Univerisity, China; Department of Electrical and Computer Engineering, University of Massachusetts Lowell, USA, Feb. 12-15, 2018, https://www.usenix.org/system/files/conference/fast18/fast18-xia.pdf.

(Continued)

*Primary Examiner* — Jacob Lipman

(74) *Attorney, Agent, or Firm* — Kilpatrick Townsend & Stockton LLP

(57) ABSTRACT

Virus scanning of container images can be managed. For example, container images can be received in a sequential order. The container images can then be analyzed to determine the contents of the container images. The container images can be arranged in a virus-scanning queue in an order that is different from the sequential order in which the container images were received based on the contents of the container images. The container images can then be scanned for viruses in the order in which the container images are arranged in the virus-scanning queue.

20 Claims, 4 Drawing Sheets

(56) References Cited

U.S. PATENT DOCUMENTS

2018/0032540 A1    2/2018  Geldman et al.
2020/0034534 A1*  1/2020  Toley ..................... G06F 21/56

OTHER PUBLICATIONS

Gupta, V., "File Detection in Network Traffic Using Approximate Matching," Department of Telematics, Norwegian University of Science and Technology, Aug. 2013, https://brage.bibsys.no/xmlui/bitstream/handle/11250/262860/651455_FULLTEXT01.pdf?sequence=2.

"Docker Security Scanning," 2018, https://docs.docker.com/v17.12/docker-cloud/builds/image-scan/#view-docker-security-scanning-results.

* cited by examiner

MANAGING VIRUS SCANNING OF CONTAINER IMAGES

REFERENCE TO RELATED APPLICATION

This is a continuation of co-pending U.S. patent application Ser. No. 16/015,956, titled "Managing Virus Scanning of Container Images" and filed on Jun. 22, 2018, the entirety of which is hereby incorporated by reference herein.

TECHNICAL FIELD

The present disclosure relates generally to information security and virus detection. More specifically, but not by way of limitation, this disclosure relates to managing virus scanning of container images.

BACKGROUND

Computers use operating systems to manage system processes and resources. Some operating systems, such as the Linux operating system, include a low-level software component for managing system processes and resources. The low-level software component is called a "kernel." The kernel can provide features, such as namespaces and cgroups, for isolating processes and resources from one another. These features can be used to segregate processes and resources (e.g., memory, CPU processing power, and network resources) into relatively isolated virtual-environments called "containers." Containers can be deployed from image files, which can be referred to as container images.

Container images are often stored in an image repository maintained by a server. As container images are added to the image repository, the server may scan the container images for computer viruses and other problems. Typically, the server scans the container images in the order in which they were received (i.e., their order of arrival).

DETAILED DESCRIPTION

Figure 1:
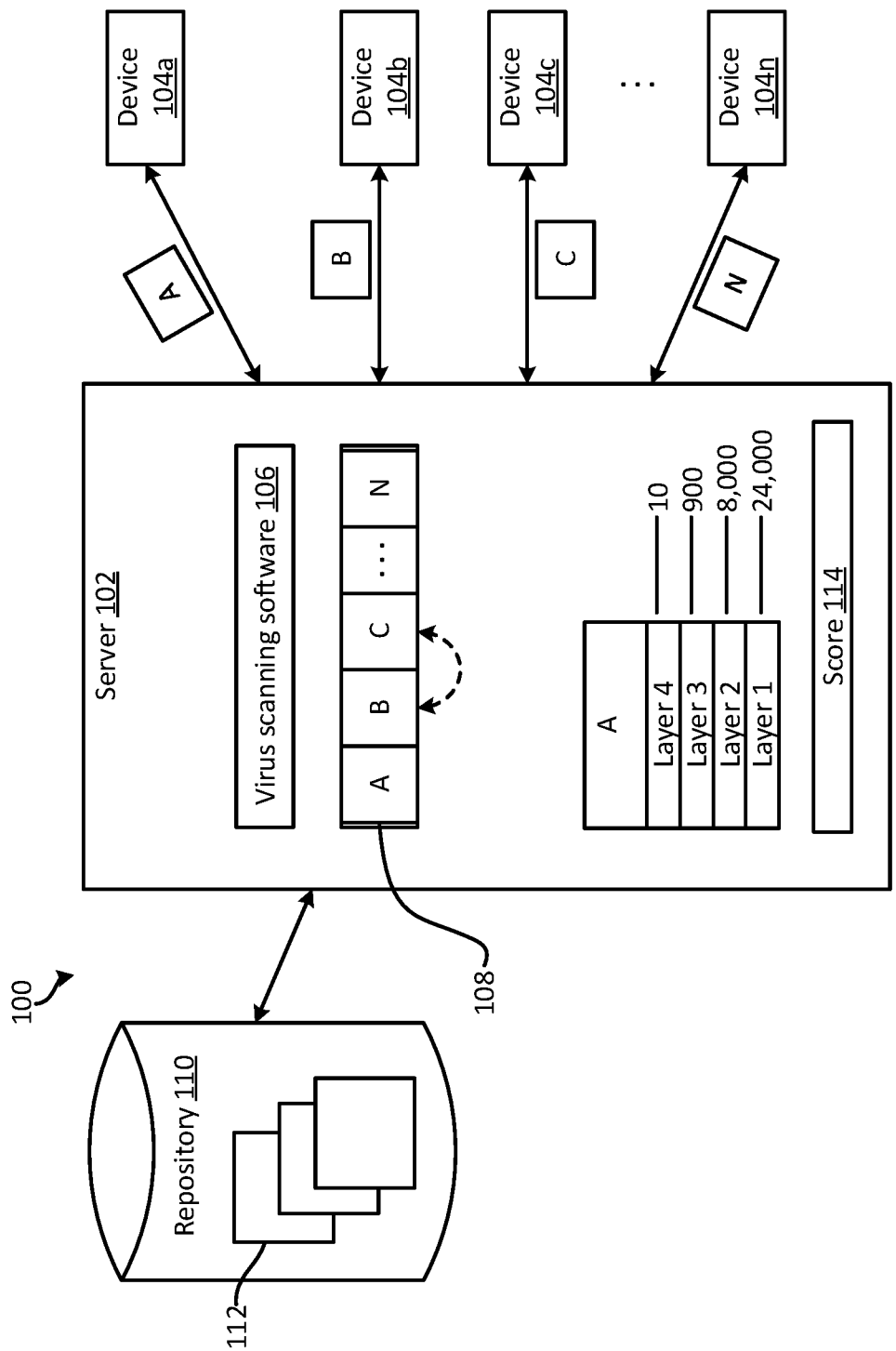
FIG. 1 is a block diagram of an example of a system for managing virus scanning of container images according to some aspects.

There can be disadvantages to the traditional approach of scanning container images for computer viruses in the order in which the container images were received. For example, container images can have different levels of risk for virus infection given their characteristics. But simply virus scanning container images in the order in which they were received ignores these different levels of risk. Consequently, lower-risk container images may be scanned sooner than higher-risk container images, depending on their order of arrival. Since container images can take a long time to virus scan given their relatively large sizes (e.g., 100+ Megabytes), scanning lower-risk container images before higher-risk container images often results in significant windows (e.g., of 24 hours or more) during which the system is vulnerable to infection.

Also, the traditional approach to virus scanning involves selecting a container image in a virus-scanning queue, loading the contents of the container image into memory (e.g., RAM), scanning the contents for viruses, and then deleting the contents from memory once the scan is complete. But this ignores that several container-images in the queue may have at least some content in common. As a result, the virus scanner may load, scan, and delete certain content in memory, only to have to have to later reload, rescan, and delete the same content for another container image in the queue. This repeated loading, scanning, and deleting of the same contents introduces unnecessary latency into the system, consumes valuable system resources, and degrades system performance.

Some examples of the present disclosure can overcome one or more of the abovementioned problems by arranging the container images in a virus-scanning queue based on the contents of the container images. The system can arrange the container images in the queue so as to prioritize the scanning of higher-risk container images over lower-risk container images. This can reduce the vulnerability window discussed above. Additionally or alternatively, the system can arrange the container images in the queue so as to position container images with common contents adjacent to one another in the queue. The system can then maintain the common contents in memory between scans, so that the same contents are not repeatedly loaded and deleted from memory. The system may also flag the comment contents as having already been scanned, so that the same contents are not repeatedly virus scanned. This can reduce or eliminate the unnecessary latency and performance degradation discussed above.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for managing virus scanning of container images according to some aspects. The system 100 includes a server 102 that can manage a repository 110 of container images 112. The server 102 can receive container images (e.g., container images A-N) from devices 104a-n for inclusion into the repository 110. Examples of the devices 104a-n can be desktop computers, mobile devices, or servers associated with the same company or different companies.

Upon receiving container images from the devices 104a-n, the server 102 can add the container images to a virus-scanning queue 108. The queue 108 can designate the order in which virus scanning software 106 is to scan the container images for viruses. In the example shown in FIG. 1, the server 102 has received container images A-N from the devices 104a-n and arranged them sequentially in the queue 108 in the order in which container images A-N were received. After adding the container images to the queue 108, in some examples, the server 102 can reorder the container images in the queue 108 based on the contents of the container images.

In some examples, the server 102 can reorder the container images in the queue 108 based on the layers in the container images. For example, as shown in FIG. 1, container image A can include four layers, with each layer having software, libraries, or other files. Some of these layers can be common among multiple container images. For example, Layer 1 of container image A can be an operating system layer that is shared with many other container images that use same operating system. In some examples, the server 102 can arrange container images in the queue 108 based on how many times some or all of the container image's layers are also present in some or all of the other container images 112 in the repository 110.

As a particular example, the server 102 can compare a layer of container image A to the layers in the other container images 112 in the repository 110 and count how many times the layer is present in the other container images 112. The server 102 can then repeat this process for some or all of the other layers in container image A. An example of this is shown in FIG. 1, in which the server 102 has determined that Layer 1 is present in 24,000 of the container images 112, Layer 2 is present in 8,000 of the container images 112, Layer 3 is present in 900 of the container images 112, and Layer 4 is present in 10 of the container images 112. These values can be referred to as counts. The server 102 can then determine a score 114 for container image A based on the counts associated with some or all of the layers. For example, the server 102 can add up the counts for all of the layers to arrive at a score of 24,000+8,000+900+10=32,910. Alternatively, the server 102 can determine an average of the counts to arrive at a score of ((24,000+8,000+900+10)/4) =8,227.5. In some examples, the server 102 can disregard one or more of the counts when calculating the score 114. As a particular example, the server 102 can disregard the count of 24,000, since this count exceeds a threshold value of 10,000. This may enable the server 102 to ignore counts for layers that are relatively ubiquitous or would otherwise skew the results. The server 102 can use any number and combination of the counts (including one) and any number and combination of techniques to determine a score 114 for a container image.

After determining a score 114 for a container image, the server 102 can position the container image at a particular location in the queue 108 based on the score 114. For example, a higher score may signify that container image A has more content in common with the other container images 112, and a lower score may signify that container image A has less content in common with the other container images 112. Since the other container images 112 have already been virus scanned and designated safe, having more content in common with the other container images 112 can indicate that container image A is less risky (more likely safe), whereas having less content in common with the other container images 112 can indicate that container image A is more risky. As a result, the server 102 can place container image A later in the queue 108 if the score 114 is higher, so that container image A is virus scanned at a later time. Or the server 102 can place container image A earlier in the queue 108 if the score 114 is lower, so that container image A is virus scanned sooner.

The server 102 can perform the above process for some or all of the container images in the queue 108 to determine scores for those container images. The server 102 can then order those container images in the queue 108 based on their respective scores (e.g., from lowest score to highest score). As a particular example, if container image B has a higher score than container image C, the positions of container images B and C can be swapped in the queue 108, as shown by a dashed arrow in FIG. 1. This can enable the more risky container-images to be virus scanned sooner than the less risky container-images.

In other examples, the server 102 can reorder the container images in the queue 108 based on common content among the container images in the queue 108. Examples of the common content can include data blocks, layers, files (e.g., applications or libraries), or any combination of these, that are common among the container images. The server 102 can reorder the container images so that container images with common content are adjacent to one another in the queue 108. This can enable the server 102 to retain the common content in memory between successive virus scans, thereby preventing the same content from being repeatedly reloaded, scanned, and deleted.

As a particular example, the server 102 can reorder the container images so that container images with common layers are positioned adjacent to one another in the queue 108. For instance, if container images A and C both have the same operating-system layer, the server 102 can rearrange the queue 108 so that container images A and C are adjacent to one another in the queue 108 (e.g., as shown by the dashed arrow). This may enable the server 102 to maintain the content of the operating-system layer in memory after virus scanning container image A, in preparation of virus scanning container image C. The server 102 can then reuse the existing operating-system-layer content in memory when virus scanning container image C, or flag that content as safe so that it is not rescanned for container image C. As another example, if container images C and N both have a common layer, the server 102 can rearrange the queue 108 so that container image N is adjacent to container image C. The server 102 can then maintain the common layer in memory after virus scanning container image C in order to virus scan container image N.

Often, a particular container image in the queue 108 will have content in common with several other container-images in the queue 108. In such cases, the server 102 may position whichever of the other container images has the most content in common with the particular container image adjacent to the particular container image. For example, container image A may have Layer 1 in common with both container images B and C. Container image A may also have Layer 3 in common with container image C. Since container image A has two layers in common with container image C, but only one layer in common with container image A, the server 102 can swap the order of container images B and C so as to position container image C adjacent to container image A. This can enable the server 102 to keep the largest amount of common content in memory during successive virus scans.

Figure 2:
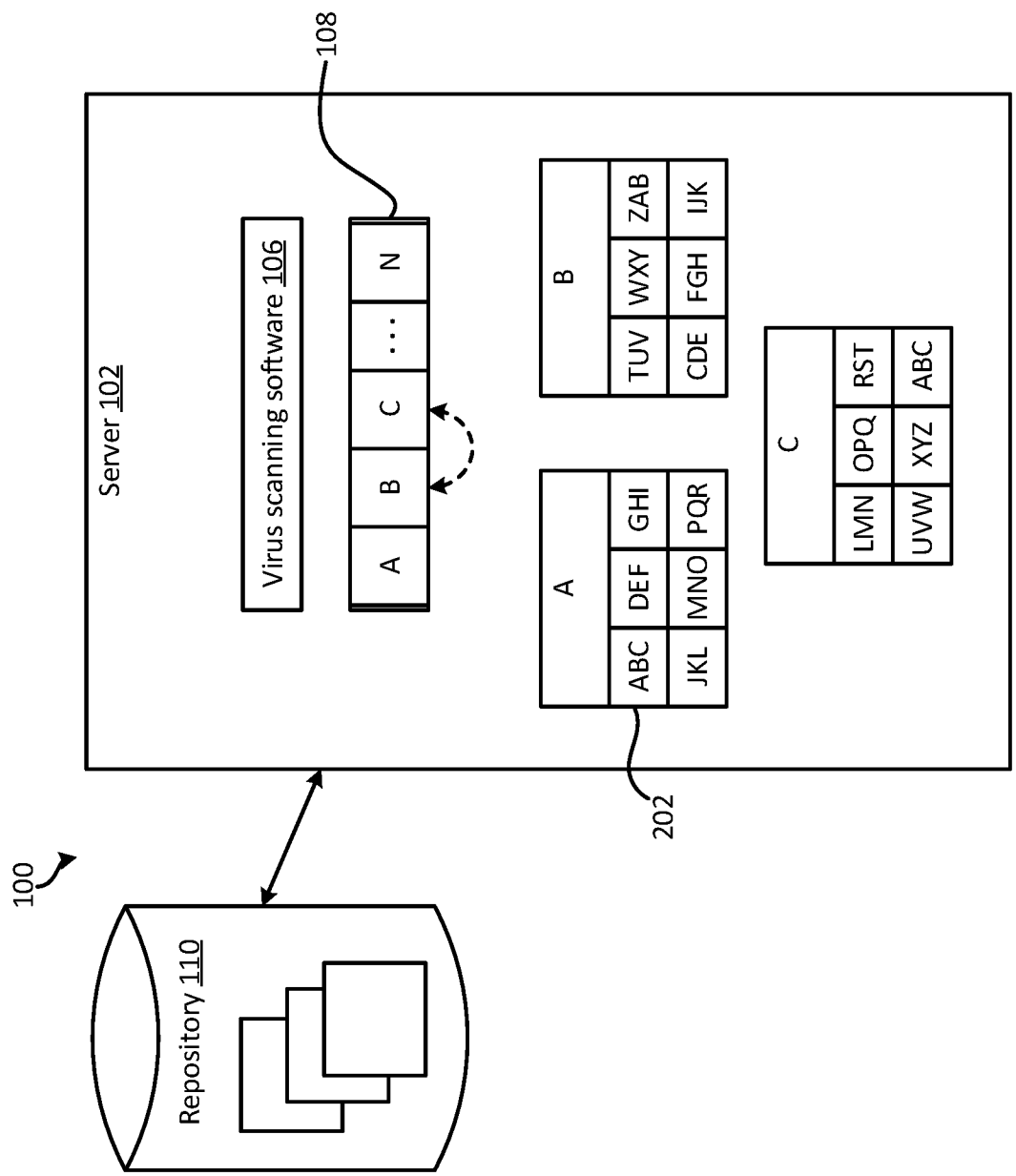
FIG. 2 is a block diagram of another example of a system for managing virus scanning of container images according to some aspects.

Another example of reordering container images in a queue 108 based on common content among the container images is shown in FIG. 2. In some such examples, the server 102 can reorder the container images in the queue 108 so that container images with common data-blocks are positioned adjacent to one another in the queue 108. For example, the server 102 can segment container image A into any number of data blocks (e.g., data chunks) of a predefined size, such as 8 bits. In the example shown in FIG. 2, the server 102 has segmented container image A into the six data-blocks with the exemplary values: ABC, DEF, GHI, JKL, MNO, and PQR. The server 102 can also segment some or all of the other container images in the queue 108 into their respective data-blocks. The server 102 can then compare hashed or unhashed versions of the data blocks in container image A with hashed or unhashed versions, respectively, of the data blocks in the other container images in the queue 108. By performing this comparison, the server 102 can determine whether container image A has any common data-blocks with the other container images and reorder the queue 108 accordingly.

For example, as shown in FIG. 2, the server 102 can determine that container image A has data block ABC in common with container image C. So, the server 102 can reposition container image C to be adjacent to container image A in the queue 108 (e.g., as shown by the dashed arrow). This may enable the server 102 to maintain data block ABC in memory after virus scanning container image A, in preparation of virus scanning container image C. The server 102 can then reuse the existing version of data block ABC in memory when virus scanning container image C, or flag data block ABC as safe so that it is ignored when virus scanning container image C. As another example, the server 102 can determine that container image N has data block XYZ in common with container image C. So, the server 102 can reposition container image N to be adjacent to container image C in the queue 108. The server 102 can then maintain data block XYZ in memory after virus scanning container image C in order to scan container image N.

Often, a particular container image in the queue 108 will have one or more data blocks in common with several other container-images in the queue 108. So, the server 102 can position whichever of the other container images has the most data blocks in common with the particular container image adjacent to the particular container image in the queue 108. For example, container image A may have data block ABC in common with both container images C and N. Container image A may also have data block GHI in common with container image N. Since container image A has two data-blocks in common with container image N, but only one data-block in common with container image C, the server 102 can position container image N adjacent to container image A.

For simplicity, some of the above examples describe first ordering the container images in the queue 108 based on their order of arrival, and then reordering the container images in the queue 108 based on the content of the container images. But the server 102 need not always first order the container images in the queue 108 according to their order of arrival. Instead, the server 102 can receive the container images, analyze their content, and create the queue 108 in the appropriate order based on their content. This process can also be performed dynamically, in real-time, as the server 102 receives new or additional container images from various devices 104a-n. Further, while some examples of the present disclosure describe a server 102 implementing certain functionality in relation to container images, other examples can involve any suitable computing device (or combination of computing devices) implementing such functionality in relation to any suitable type of file, such as virtual-machine images, executable files, audio files, video files, etc.

Figure 3:
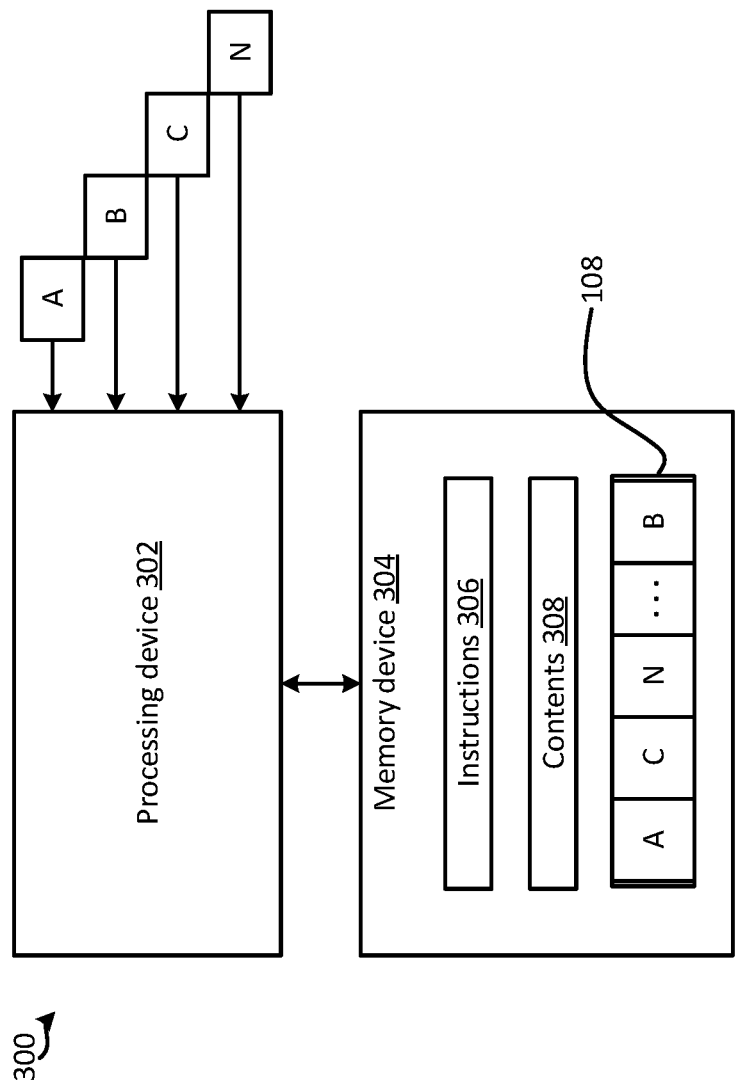
FIG. 3 is a block diagram of another example of a system for managing virus scanning of container images according to some aspects.

FIG. 3 is a block diagram of another example of a system 300 for managing container images according to some aspects. The system 300 includes a processing device 302 communicatively coupled with a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processing device 302 can receive container images (e.g., A-N) in a sequential order. The processing device 302 can then determine the contents 308 of the container images. Examples of the contents 308 can include layers of the container images, data blocks in the container images, one or more files in the container images, or any combination of these. The processing device 302 can determine the contents 308 of the container images by analyzing one or more facets of the container images.

After determining the contents 308 of the container images, the processing device 302 can arrange the container images in a virus-scanning queue 108 in an order that is different from the sequential order in which the container images were received. The processing device 302 can arrange the container images in that order based on the contents 308 of the container images. For example, the processing device 302 can implement any amount and combination of the functionality discussed above with respect to FIGS. 1-2 to arrange the container images in a particular order that is dependent on the layers, data blocks, or both in the container images. Then, the processing device 302 can scan the container images for viruses in the order in which the container images are arranged in the queue 108.

Figure 4:
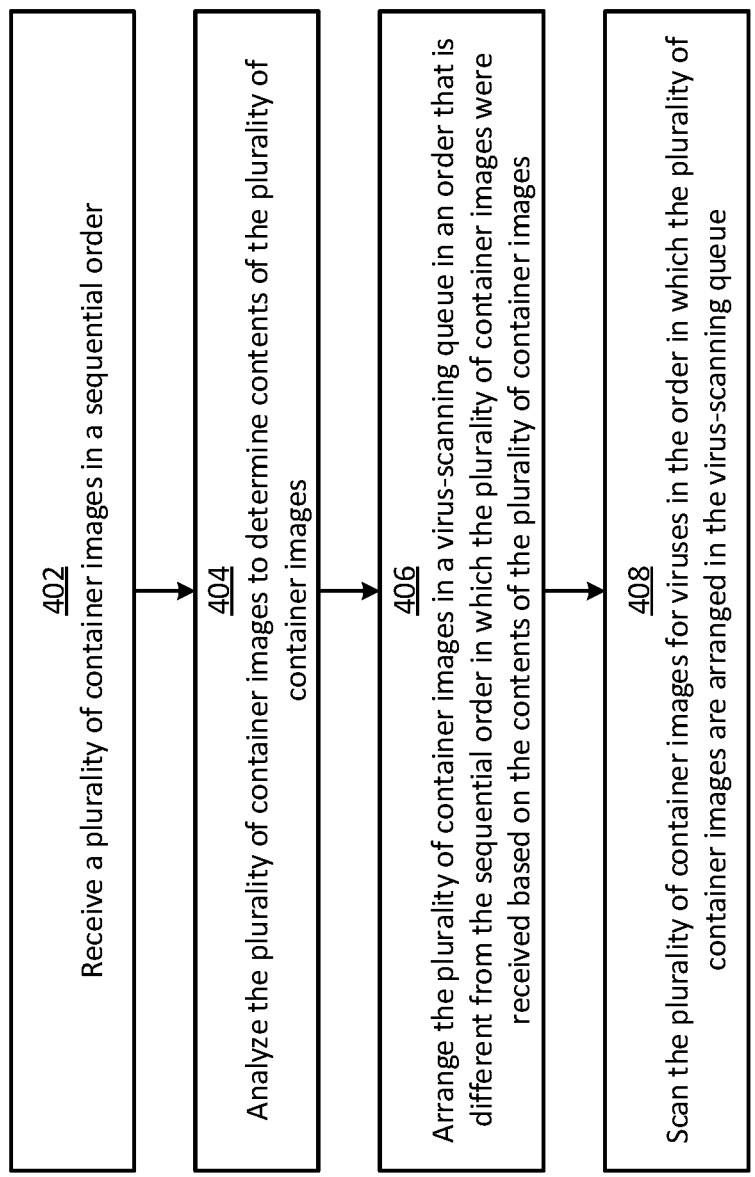
FIG. 4 is a flow chart of another example of a process for managing virus scanning of container images according to some aspects.

In some examples, the processing device 302 can implement some or all of the steps shown in FIG. 4. Other examples can include more steps, fewer steps, different steps, or a different combination of steps than are shown in FIG. 4. The steps of FIG. 4 are discussed below with reference to the components discussed above in relation to FIG. 3.

In block 402, a processing device 302 receives a plurality of container images (e.g., container images A-N) in a sequential order. The processing device 302 can receive the plurality of container images from any number and combination of devices associated with any number and combination of entities.

In block 404, the processing device 302 analyzes the plurality of container images to determine contents 308 of the plurality of container images. Some examples of the contents 308 can include layers, data blocks, files, or any combination of these, associated with the container images.

In block 406, the processing device 302 arranges the plurality of container images in a virus-scanning queue 108 in an order that is different from the sequential order in which the plurality of container images were received based on the contents 308 of the plurality of container images.

In some examples, the processing device 302 can arrange the container images based on common content among the container images in the queue 108. For instance, the processing device 302 can arrange the container images in the queue 108 based on common data-blocks among the container images in the queue 108.

Additionally or alternatively, the processing device 302 can position a container image in the queue 108 based on how many times one or more of the layers in the container image is present in a group of other container images (e.g., in a repository). The processing device 302 can use any number and combination of techniques to arrange the plurality of container images in the queue 108 based on the contents 308 of the plurality of container images.

In block 408, the processing device 302 scans the plurality of container images for viruses in the order in which the plurality of container images are arranged in the virus-scanning queue 108. For example, the processing device 302 can use virus scanning software to scan the first container-image in the queue 108 for viruses, then scan the second container-image in the queue 108 for viruses, then scan the third container-image in the queue 108 for viruses, and so on, sequentially. In some examples, the processing device 302 can maintain common content among adjacent container-images in the queue 108 in the memory device 304 during successive scans.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A system comprising:
a processing device; and
a memory device including instructions that are executable by the processing device for causing the processing device to:
receive a plurality of files in a sequential order;
determine an order in which to organize the plurality of files in a virus-scanning queue by accessing and analyzing content in the plurality of files, the order being different from the sequential order in which the plurality of files were received;
arrange the plurality of files in the virus-scanning queue in the order; and
scan the plurality of files for viruses in the order in which the plurality of files are arranged in the virus-scanning queue.

2. The system of claim 1, wherein the memory device further includes instructions that are executable by the processing device for causing the processing device to:
determine how many data blocks each respective file among the plurality of files has in common with every other file among the plurality of files; and
arrange the plurality of files in the virus-scanning queue such that each respective file is positioned in the virus-scanning queue adjacent to another file that has a highest number of data blocks in common with the respective file.

3. The system of claim 2, wherein the memory device further includes instructions that are executable by the processing device for causing the processing device to determine how many data blocks that a file among the plurality of files has in common with every other file among the plurality of files by:
segmenting the file into the data blocks; and
counting how many of the data blocks the file has in common with each of the other files.

4. The system of claim 3, wherein the memory device further includes instructions that are executable by the processing device for causing the processing device to arrange the plurality of files in the virus-scanning queue by:
determining that a particular file among the other files has a highest number of the data blocks in common with the file; and
in response to determining that the particular file has the highest number of the data blocks in common with the file, positioning the particular file adjacent to the file in the virus-scanning queue.

5. The system of claim 1, wherein the memory device further includes instructions that are executable by the processing device for causing the processing device to:
determine respective counts for layers of a file among the plurality of files, each respective count indicating how many times a respective layer among the layers is present in a group of files in a repository;
determine a score for the file based on the respective counts for the layers; and
position the file at a particular location in the virus-scanning queue based on the score for the file.

6. The system of claim 5, wherein the memory device further includes instructions that are executable by the processing device for causing the processing device to:
position the file later in the virus-scanning queue than another file among the plurality of files in response to determining that the score is higher than another score for the other file; or
position the file earlier in the virus-scanning queue than the other file in response to determining that the score is lower than the other score for the other file.

7. The system of claim 5, wherein the memory device further includes instructions that are executable by the processing device for causing the processing device to determine the score for the file by:
determining that a count among the respective counts exceeds a threshold value; and
in response to determining that the count exceeds the threshold value, disregarding the count when calculating the score.

8. The system of claim 5, wherein the memory device further includes instructions that are executable by the processing device for causing the processing device to determine that the score for the file is an average value of the respective counts.

9. A non-transitory computer-readable medium comprising program code that is executable by a processing device for causing the processing device to:
receive a plurality of files in a sequential order;
determine an order in which to organize the plurality of files in a virus-scanning queue by accessing and analyzing content in the plurality of files, the order being different from the sequential order in which the plurality of files were received;
arrange the plurality of files in the virus-scanning queue in the order; and
scan the plurality of files for viruses in the order in which the plurality of files are arranged in the virus-scanning queue.

10. The non-transitory computer-readable medium of claim 9, further comprising program code that is executable by the processing device for causing the processing device to:
  determine how many data blocks each respective file among the plurality of files has in common with every other file among the plurality of files; and
  arrange the plurality of files in the virus-scanning queue such that each respective file is positioned in the virus-scanning queue adjacent to another file that has a highest number of data blocks in common with the respective file.

11. The non-transitory computer-readable medium of claim 10, further comprising program code that is executable by the processing device for causing the processing device to determine how many data blocks that a file among the plurality of files has in common with every other file among the plurality of files by:
  segmenting the file into the data blocks; and
  counting how many of the data blocks the file has in common with each of the other files.

12. The non-transitory computer-readable medium of claim 11, further comprising program code that is executable by the processing device for causing the processing device to arrange the plurality of files in the virus-scanning queue by:
  determining that a particular file among the other files has a highest number of the data blocks in common with the file; and
  in response to determining that the particular file has the highest number of the data blocks in common with the file, positioning the particular file adjacent to the file in the virus-scanning queue.

13. The non-transitory computer-readable medium of claim 9, further comprising program code that is executable by the processing device for causing the processing device to:
  determine respective counts for layers of a file among the plurality of files, each respective count indicating how many times a respective layer among the layers is present in a group of files in a repository;
  determine a score for the file based on the respective counts for the layers; and
  position the file at a particular location in the virus-scanning queue based on the score for the file.

14. The non-transitory computer-readable medium of claim 13, further comprising program code that is executable by the processing device for causing the processing device to:
  position the file later in the virus-scanning queue than another file among the plurality of files in response to determining that the score is higher than another score for the other file; or
  position the file earlier in the virus-scanning queue than the other file in response to determining that the score is lower than the other score for the other file.

15. A method comprising:
  receiving, by a processing device, a plurality of files in a sequential order;
  determining, by the processing device, an order in which to organize the plurality of files in a virus-scanning queue by accessing and analyzing content in the plurality of files, the order being different from the sequential order in which the plurality of files were received;
  arranging, by the processing device, the plurality of files in the virus-scanning queue in the order; and
  scanning, by the processing device, the plurality of files for viruses in the order in which the plurality of files are arranged in the virus-scanning queue.

16. The method of claim 15, further comprising:
  determining how many data blocks each respective file among the plurality of files has in common with every other file among the plurality of files; and
  arranging the plurality of files in the virus-scanning queue such that each respective file is positioned in the virus-scanning queue adjacent to another file that has a highest number of data blocks in common with the respective file.

17. The method of claim 16, further comprising determining how many data blocks that a file among the plurality of files has in common with every other file among the plurality of files by:
  segmenting the file into the data blocks; and
  counting how many of the data blocks the file has in common with each of the other files.

18. The method of claim 17, further comprising arranging the plurality of files in the virus-scanning queue by:
  determining that a particular file among the other files has a highest number of the data blocks in common with the file; and
  in response to determining that the particular file has the highest number of the data blocks in common with the file, positioning the particular file adjacent to the file in the virus-scanning queue.

19. The method of claim 15, further comprising:
  determining respective counts for layers of a file among the plurality of files, each respective count indicating how many times a respective layer among the layers is present in a group of files in a repository;
  determining a score for the file based on the respective counts for the layers; and
  positioning the file at a particular location in the virus-scanning queue based on the score for the file.

20. The method of claim 19, further comprising:
  positioning the file later in the virus-scanning queue than another file among the plurality of files in response to determining that the score is higher than another score for the other file; or
  positioning the file earlier in the virus-scanning queue than the other file in response to determining that the score is lower than the other score for the other file.

* * * * *